(12) United States Patent
Dudar (10) Patent No.: US 9,945,752 B2
(45) Date of Patent: Apr. 17, 2018

(54) FUEL TANK PRESSURE SENSOR RATIONALITY TESTING FOR PLUG-IN HYBRID ELECTRIC VEHICLES

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 14/968,461

(22) Filed: Dec. 14, 2015

(65) Prior Publication Data
US 2017/0167909 A1    Jun. 15, 2017

(51) Int. Cl.
| G01F 23/32 | (2006.01) |
| G01L 27/00 | (2006.01) |
| G01M 17/007 | (2006.01) |

(52) U.S. Cl.
CPC .......... *G01L 27/002* (2013.01); *G01L 27/007* (2013.01); *G01M 17/007* (2013.01)

(58) Field of Classification Search
USPC .......................................................... 73/301
See application file for complete search history.

(56) References Cited

U.S. PATENT DOCUMENTS

| 8,342,157 B2 * | 1/2013 | Der Manuelian .. F02M 25/0809 123/495 |
| 8,353,273 B2 | 1/2013 | McLain et al. |
| 9,073,442 B2 | 7/2015 | Ichikawa |
| 9,217,397 B2 | 12/2015 | Peters et al. |
| 9,618,381 B1 * | 4/2017 | Dudar ................. G01F 25/0069 |
| 9,669,825 B1 * | 6/2017 | Dudar ................... B60W 20/40 |
| 2007/0131505 A1 * | 6/2007 | Kim .......................... B60L 5/005 191/14 |
| 2010/0235006 A1 * | 9/2010 | Brown .................. B60L 11/182 700/286 |
| 2012/0152210 A1 * | 6/2012 | Reddy .................. F02M 25/089 123/520 |

(Continued)

OTHER PUBLICATIONS

Dudar, Aed M., "Evaporative Emissions Testing Using Inductive Heating," U.S. Appl. No. 14/866,305, filed Sep. 25, 2015, 59 pages.

(Continued)

*Primary Examiner* — Eric S McCall
*Assistant Examiner* — Mohammed E Keramet-Amircolai
(74) *Attorney, Agent, or Firm* — James Dottavio; McCoy Russell LLP (57) ABSTRACT

A method for a hybrid-electric vehicle is presented, wherein a fuel tank is sealed closed during a first condition that includes an inductive charging event, and wherein degradation of a fuel tank pressure transducer is indicated responsive to a fuel tank pressure transducer output failing to increase above a threshold following an active testing duration. The outer walls of the fuel tank may include ferrous components which are energized by a magnetic field generated during the inductive charging event, thus heating the fuel tank and the fuel stored within. In this way, the pressure within the sealed fuel tank increases during the inductive charging event, and a determination may be made as to whether the output of the fuel tank pressure transducer is rational.

20 Claims, 6 Drawing Sheets

(56) References Cited

U.S. PATENT DOCUMENTS

| | | | |
|---|---|---|---|
| 2012/0211087 A1* | 8/2012 | Dudar | F02D 41/0032 137/12 |
| 2013/0037365 A1* | 2/2013 | Ichikawa | B60L 11/123 191/10 |
| 2013/0112176 A1* | 5/2013 | Peters | F02M 25/0809 123/521 |
| 2013/0249682 A1* | 9/2013 | Van Wiemeersch | B60R 25/1004 340/426.24 |
| 2013/0297191 A1* | 11/2013 | Gibson | F02N 11/0855 701/112 |
| 2014/0130781 A1* | 5/2014 | Jentz | F02M 25/0809 123/520 |
| 2014/0230795 A1* | 8/2014 | Jentz | F02M 25/0854 123/520 |
| 2014/0239729 A1* | 8/2014 | Covic | H02J 17/00 307/104 |
| 2014/0260549 A1* | 9/2014 | Dudar | F02M 65/006 73/40 |
| 2014/0297071 A1* | 10/2014 | Dudar | F02D 41/22 701/22 |
| 2014/0316638 A1* | 10/2014 | Dudar | F02D 29/02 701/29.4 |
| 2014/0330482 A1* | 11/2014 | Yang | G07C 5/00 701/34.4 |
| 2014/0374177 A1* | 12/2014 | Yang | B60K 15/035 180/65.21 |
| 2015/0075251 A1 | 3/2015 | Jentz et al. | |
| 2015/0075267 A1 | 3/2015 | Sweppy et al. | |
| 2015/0075501 A1* | 3/2015 | Peters | F02M 25/0854 123/520 |

OTHER PUBLICATIONS

Dudar, Aed M., "Fuel Tank Pressure Sensor Rationality for a Hybrid Vehicle During Refueling," U.S. Appl. No. 14/630,314, filed Feb. 24, 2015, 46 pages.

* cited by examiner

FUEL TANK PRESSURE SENSOR RATIONALITY TESTING FOR PLUG-IN HYBRID ELECTRIC VEHICLES

FIELD

The present description relates generally to methods and systems for actively adjusting a fuel system pressure to determine the functionality of a fuel tank pressure sensor.

BACKGROUND/SUMMARY

Undesired evaporative emission detection routines may be intermittently performed on a vehicle fuel system and emissions control system to confirm that the systems are not degraded. Undesired evaporative emissions detection routines may be performed while the engine is running using engine intake manifold vacuum. However, for hybrid-electric vehicles, engine run time may be limited. As such, undesired evaporative emissions detection routines may be performed when the vehicle is off using engine-off natural vacuum (EONV) generated due to a change in temperature and pressure within the fuel tank following engine shutdown and/or with vacuum supplemented from a vacuum pump. If the systems are sealed from atmosphere, a pressure or vacuum will develop there within responsive to changes in ambient temperature if the systems are intact.

Such routines rely on a functional fuel tank pressure transducer (FTPT) to measure the pressure or vacuum within the fuel system. As such, the rationality of the FTPT must be periodically tested and confirmed. The FTPT may be tested for offset, to determine if a baseline output of the FTPT is accurate. One example approach for an FTPT offset test is shown by Jentz et al. in U.S. Patent Application 2015/0075251. Therein, the fuel tank is vented to atmosphere for a lengthy vehicle-off soak. If the FTPT is functional, a value within a threshold of atmospheric pressure should be output following the vehicle-off soak. A deviation from atmospheric pressure may result in a diagnostic trouble code (DTC) being set at the controller, and/or may result in the FTPT output being adjusted to compensate for any offset.

However, the inventors herein have recognized potential issues with such systems. As one example, venting the fuel tank to atmosphere may result in fuel vapor trafficking to a fuel vapor canister. For vehicles with limited engine run-time, opportunities for purging the fuel vapor canister to engine intake may be limited. This could increase evaporative emissions if a saturated fuel vapor canister is exposed to multiple diurnal cycles. If the engine must be forced on to purge the canister, the fuel efficiency of the vehicle may be reduced.

In one example, the issues described above may be addressed by a method for a hybrid-electric vehicle, wherein a fuel tank is sealed closed during a first condition that includes an inductive charging event, and wherein degradation of a fuel tank pressure transducer is indicated responsive to a fuel tank pressure transducer output failing to increase above a threshold following an active testing duration. The outer walls of the fuel tank may include ferrous components which are energized by a magnetic field generated during the inductive charging event, thus heating the fuel tank and the fuel stored within. In this way, the pressure within the sealed fuel tank increases during the inductive charging event, and a determination may be made as to whether the output of the fuel tank pressure transducer is rational.

As one example, such an active fuel tank pressure transducer rationality tests may be indicated following one or more indeterminate passive fuel tank pressure transducer rationality tests. Passive fuel tank pressure transducer rationality tests typically compare fuel tank pressure transducer output with ambient temperature over a vehicle-off soak. However, if the vehicle is operated in a location with a modest diurnal cycle, the ambient temperature may stay relatively constant during a vehicle-off soak. By indicating an active test during an inductive charging event, the fuel tank pressure can be controllably adjusted without requiring additional hardware, and without increasing undesired evaporative emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
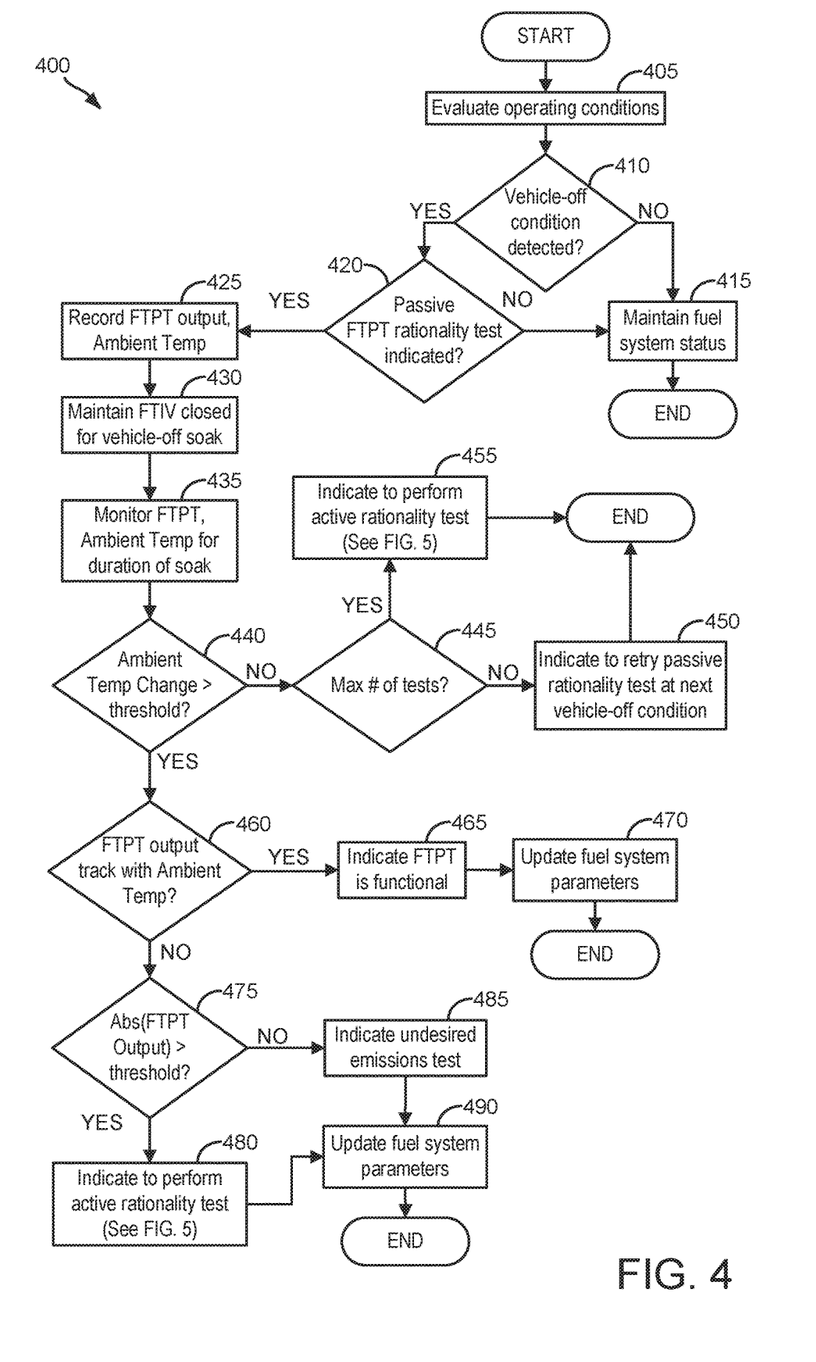
FIG. 4 depicts a flow chart for a high-level method for a passive fuel tank pressure transducer rationality test.
Figure 5:
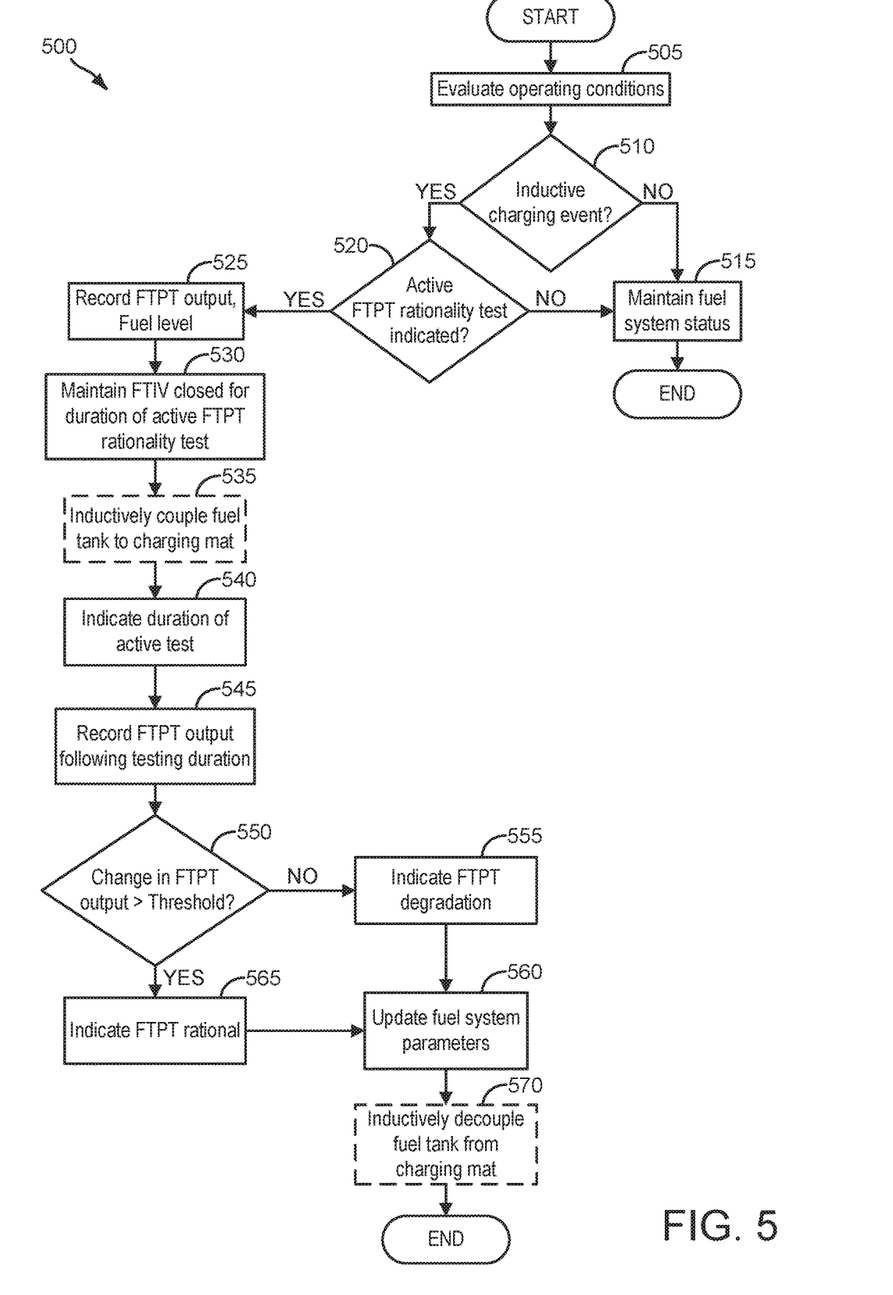
FIG. 5 depicts a flow chart for a high-level method for an active fuel tank pressure transducer rationality test.
Figure 6:
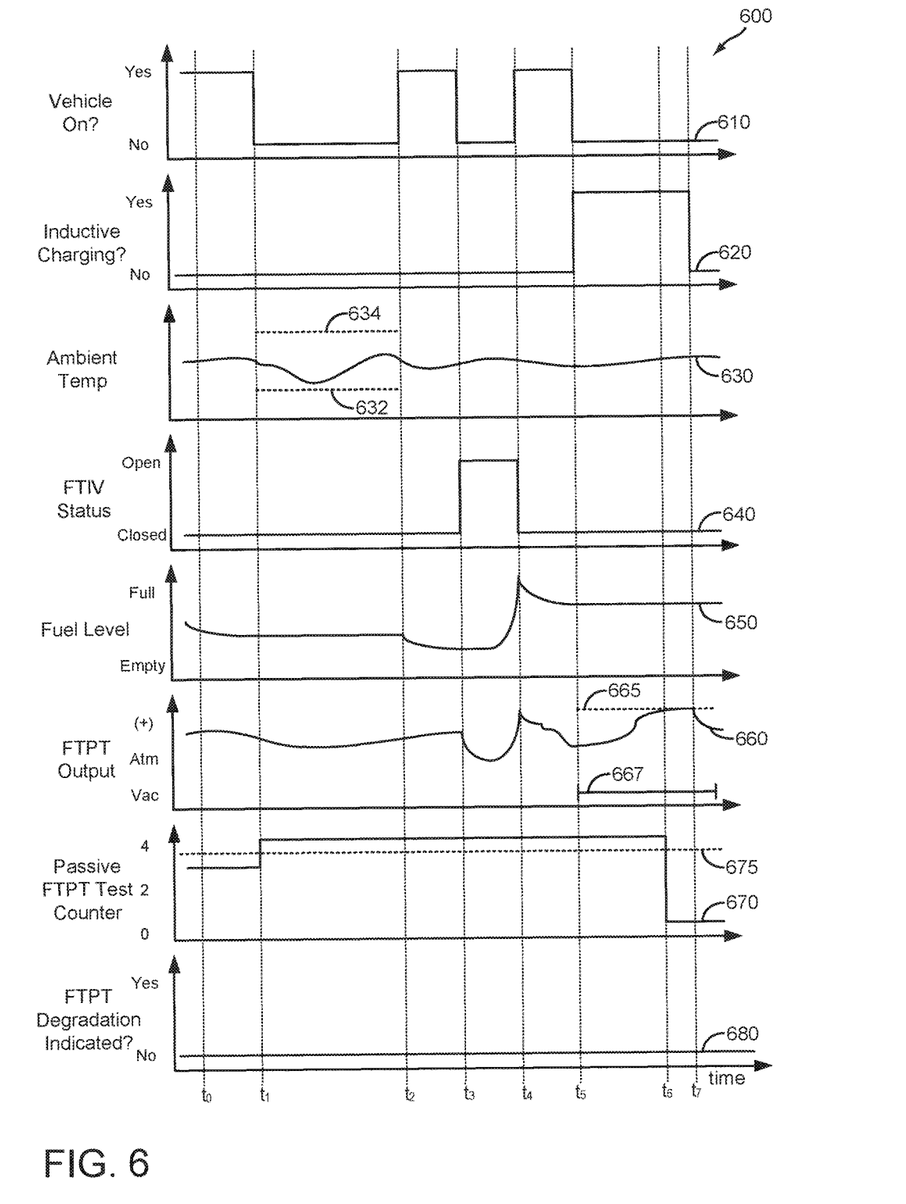
FIG. 6 depicts an example timeline for fuel tank pressure transducer rationality tests in a vehicle comprising an inductive charging system.

The following description relates to systems and methods for determining the rationality of a fuel tank pressure transducer. More specifically, the description relates to systems and methods for actively testing a fuel tank pressure transducer using inductive energy transfer to a fuel tank. Vehicles with a hybrid propulsion system, such as the propulsion system depicted in FIG. 1, may comprise a rechargeable battery which supplies power to an electric motor as well as an internal combustion engine which operates on a combustible fuel source. In order to reduce evaporative emissions, the vehicle fuel tank may be sealed with an isolation valve during non-refueling conditions to prevent overloading of the fuel vapor canister. Such an evaporative emission system is depicted in FIG. 2. The rechargeable battery may be configured to derive power from an external A/C voltage source through a charging cable and/or through an inductive charging system, such as the inductive charging system of FIG. 3. The inductive charging system may include an external primary inductive coil (e.g., within a recharging mat) configured to generate a magnetic field. Such a magnetic field may energize ferrous components on the undercarriage of the vehicle, such as a steel fuel tank. As such, during an inductive charging event, the fuel tank may be inductively energized, heating the fuel within and generating fuel vapor. Periodically, a passive rationality test may be performed on a fuel tank pressure transducer using diurnal temperature cycles, as depicted in FIG. 4. If one or more passive rationality tests are inconclusive, an active rationality test may be indicated, wherein inductive heating of the fuel tank is used to increase the fuel tank pressure. The output of the fuel tank pressure transducer may then be evaluated, as shown in FIG. 5. An example timeline for such a combined fuel tank pressure transducer rationality test is depicted in FIG. 6.

Figure 1:
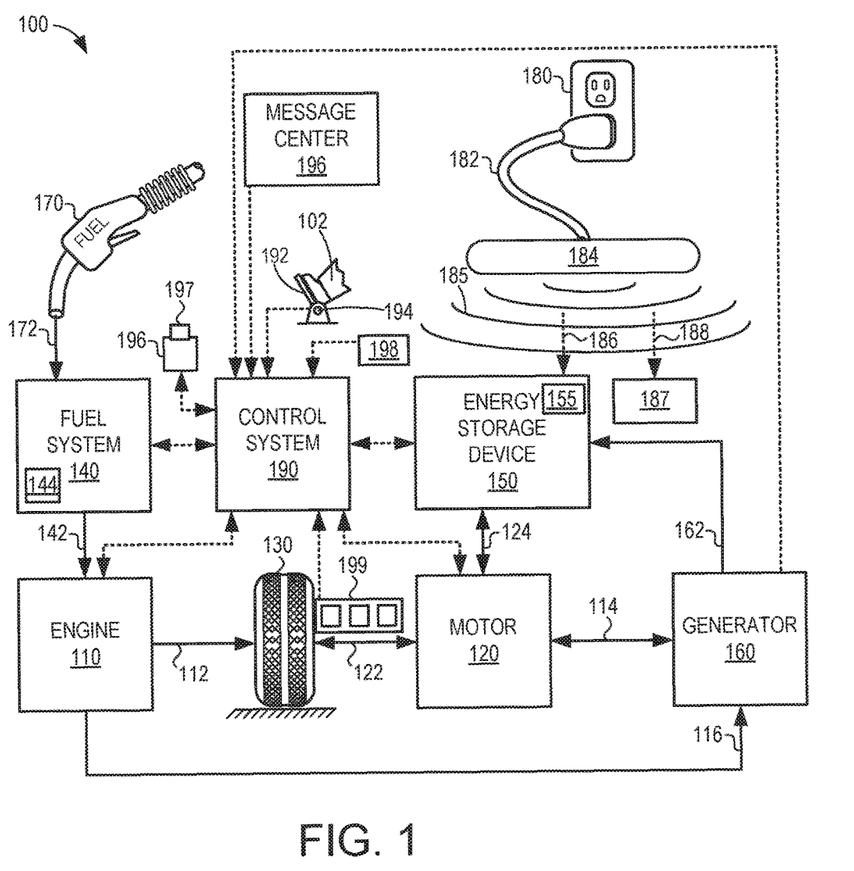
FIG. 1 schematically shows an example vehicle propulsion system.
Figure 2:
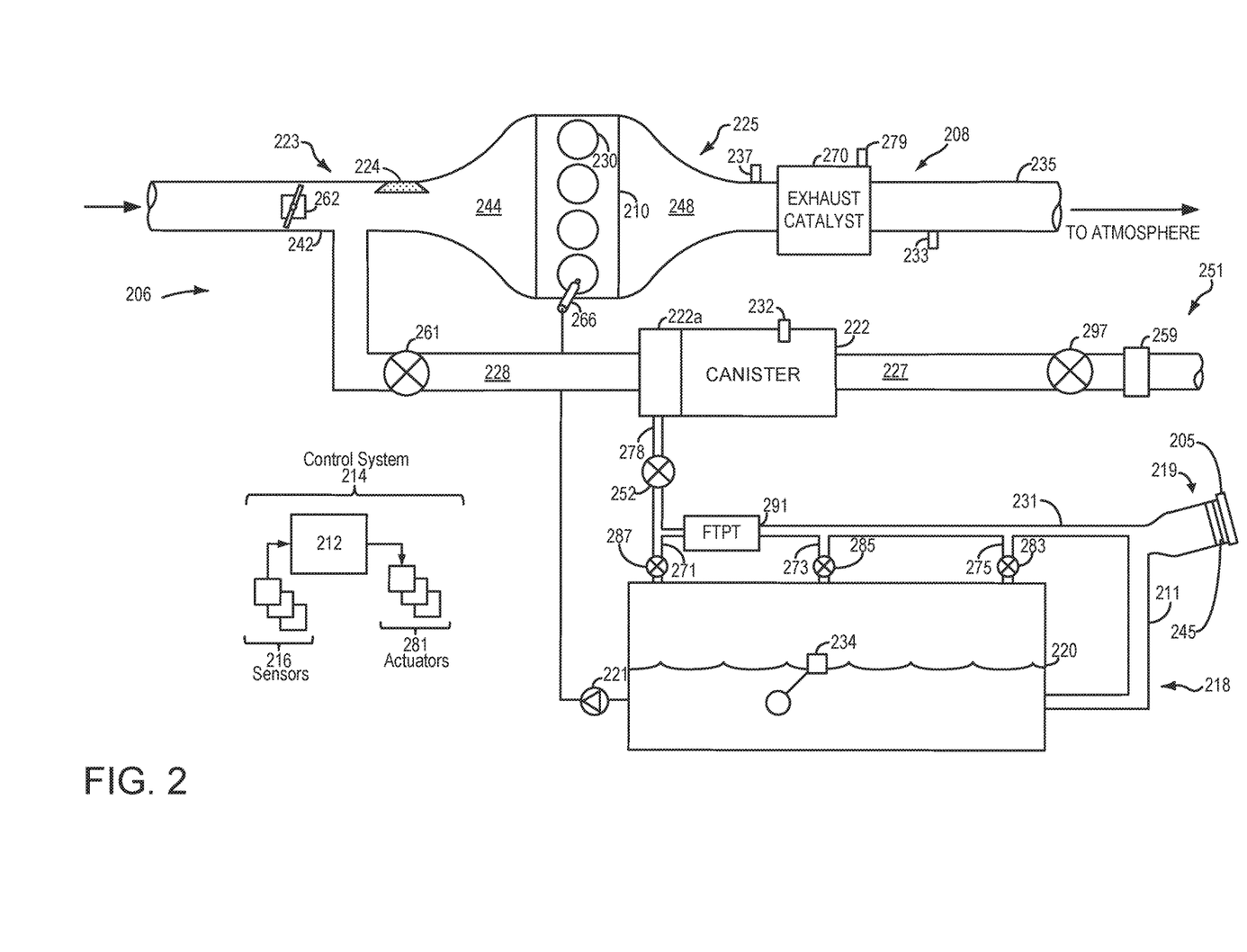
FIG. 2 schematically shows an example vehicle system with a fuel system and an evaporative emissions system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle). As a non-limiting example, vehicle propulsion system 100 may be configured as a plug-in hybrid electric vehicle (PHEV), whereby electrical energy may be supplied to energy storage device 150 from power source 180 via an electrical energy transmission cable (not shown) coupled to a charging port at the vehicle exterior. While the vehicle propulsion system is operated to propel the vehicle, electrical transmission cable may disconnected between power source 180 and energy storage device 150. Control system 190 may identify and/or control the amount of electrical energy stored at the energy storage device, which may be referred to as the state of charge (SOC).

In other embodiments, physical connection between power source 180 and the vehicle via an electrical transmission cable may be omitted, whereby electrical energy may be received wirelessly at energy storage device 150 from power source 180. In one example, an alternating current (AC) power source 180 may supply power to a charging mat 184 via an electrical transmission cable 182. AC power supplied to charging mat 184 may generate a magnetic field 185 that may be transmitted to the vehicle, indicated by arrow 186, whereat the alternating current may be converted into direct current via an AC/DC rectifier 155 for storage at energy storage device 150. As such, electrical energy may be received wirelessly from power source 180 via electromagnetic induction. Moreover, it will be appreciated that energy storage device 150 may receive electrical energy from power source 180 via any suitable approach for recharging energy storage device 150 from an external power source that does not comprise part of the vehicle. In this way, motor 120 may propel the vehicle by utilizing an energy source other than the fuel utilized by engine 110.

Further, when charging mat 184 is positioned underneath the vehicle, ferrous components 187 of the vehicle undercarriage may also fall within the magnetic field 185 generated by charging mat 184. Ferrous components 187 may thus also receive electrical energy concurrently with energy storage device 150, as indicated by arrow 188. Ferrous components 187 may be utilized to transmit this electrical energy for charging or powering one or more vehicle components. Further, ferrous components 187 may be utilized to generate thermal energy from the received electrical energy, thereby heating one or more vehicle components. As will be described in further detail below with regard to the systems discussed in FIGS. 2-3, fuel tank 144 may be heated in this fashion if the outer walls of fuel tank 144 are ferrous (e.g., steel) and/or are electrically coupled to ferrous components 187. Inductive heating of fuel tank 144 and the fuel stored therein may function to actively generate fuel vapor pressure within the fuel tank. This pressure may subsequently be used to diagnose the functionality and/or integrity of one or more components of fuel system 140.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an evaporative emissions control (Evap) system 251 and a fuel system 218. Evap system 251 includes a fuel vapor container or canister 222 which may be used to capture and store fuel vapors. In some examples, vehicle system 206 may be a hybrid electric vehicle (HEV) system or a plug-in hybrid electric vehicle system (PHEV).

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. Exhaust catalyst may include a temperature sensor 279. In some examples one or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed Evap system 251, which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Evap system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations, "running loss" (that is, fuel vaporized during vehicle operation), and diurnal cycles. In one example, the adsorbent used is activated charcoal. Evap system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve (CVV) 297 coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Undesired vapor emissions detection routines may be intermittently performed by controller 212 on fuel system 218 and Evap system 251 to confirm that the fuel system 218 and Evap system 251 are not degraded. As such, evaporative emissions testing may be performed while the engine is off (engine-off test) using engine-off natural vacuum (EONV) generated due to a change in temperature and pressure at the fuel tank following engine shutdown. For example, responsive to an engine-off event, a fuel system may be isolated and the pressure in the fuel system may be monitored. Identification of undesired vapor emissions may be indicated based on a pressure rise below a threshold, or a rate of pressure rise below a threshold rate. Furthermore, as the fuel tank cools down, vacuum generation may be monitored and undesired vapor emissions identified based on development of a vacuum below a threshold, or a rate of vacuum development below a threshold rate.

In alternate examples, evaporative emissions testing routines may be performed while the engine is running by using engine intake manifold vacuum, or while the engine is either running or during engine-off conditions by operating a vacuum pump. For example, undesired evaporative emissions tests may be performed by an evaporative emissions check module (not shown) communicatively coupled to controller 212. An evaporative emissions check module may be coupled in vent 227, for example, between canister 222 and the atmosphere. An evaporative emissions check module may include a vacuum pump for applying negative pressure to the fuel system when administering an evaporative emissions test. In some embodiments, the vacuum pump may be configured to be reversible. In other words, the vacuum pump may be configured to apply either a negative pressure or a positive pressure on the fuel system.

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and in some cases while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a default open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291 (fuel tank pressure transducer), and canister temperature sensor 232. Other sensors such as pressure, temperature, air/fuel ratio, and composition sensors may be coupled to various locations in the vehicle system 206. As another example, the actuators may include fuel injector 266, throttle 262, fuel tank isolation valve 252, CPV 261 and refueling lock 245. The controller 212 may receive input data from the various sensors, process the input data, and trigger the actuators in response to the processed input data based on instruction or code programmed therein corresponding to one or more routines. Example control routines are described herein with regard to FIGS. 4 and 5.

In some examples, the controller may be placed in a reduced power mode or sleep mode, wherein the controller maintains essential functions only, and operates with lower battery consumption than in a corresponding awake mode. For example, the controller may be placed in a sleep mode following a vehicle-off event in order to perform a diagnostic routine at a duration following the vehicle-off event. The controller may have a wake input that allows the controller to be returned to an awake mode based on an input received from one or more sensors.

For PHEVs, the controller may be operated in a plugged-in mode while the vehicle is coupled to an external power source. For example, the controller may operate on power derived from the external power source, and not operate on power derived from an on-board energy storage device. A partial reduced power mode may be employed during a plugged-in mode, allowing for some controller functions outside of designated essential functions. Similarly, the controller may be operated in an inductive charging mode while the vehicle is inductively coupled to an external power source. In some embodiments, a state of battery charge during an inductive charging operation may trigger a return to an awake mode such that a method stored in the controller may be executed in order to decouple the magnetic field from the fuel tank. If the vehicle remains electrically coupled to an external power source following achievement of a fully charged energy storage device, the controller may be operated in a pre-ignition mode, wherein non-essential vehicle functions are performed using energy from the external power source in anticipation of a vehicle and/or engine start-up event.

Figure 3:
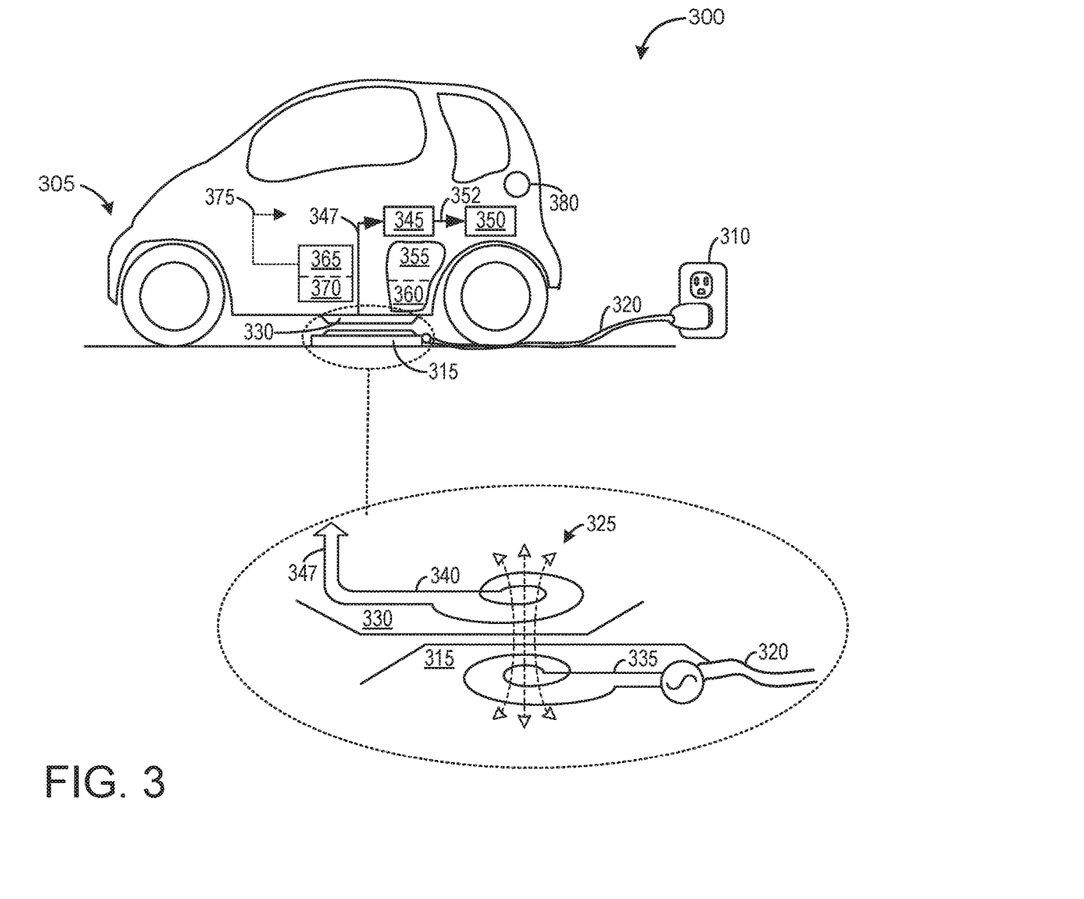
FIG. 3 schematically shows an inductive charging system for a vehicle.

FIG. 3 schematically shows a (wireless) inductive charging system 300 for a vehicle. As shown in this figure, inductive charging system 300 includes a vehicle 305, the vehicle comprising a plug-in hybrid electric vehicle (PHEV). In some examples, vehicle 305 may comprise an electrically powered vehicle without a combustion engine. An alternating current (AC) power source 310 supplies power to a charging mat 315 via an electrical transmission cable 320. When AC power is supplied to the charging mat 315, a magnetic field 325 is generated such that electrical energy is transmitted in a non-contact manner to a receiving mat 330 located on the undercarriage of vehicle 305. More specifically, charging mat 315 contains a primary coil 335, and receiving mat 330 contains a secondary coil 340. When primary coil 335 is electrically charged, magnetic field 325 induces a current in secondary coil 340. Current induced in secondary coil 340 may be transmitted to an AC/DC rectifier 345, as indicated by arrow 347, wherein alternating current may be converted into direct current for charging a battery 350, as indicated by arrow 352.

The secondary coil 340 in the receiving mat 330 may be positioned in close proximity to a fuel tank 355. As such, during an inductive charging operation where the primary coil 335 in the charging mat 315 is positioned in close proximity to the secondary coil 340 in the receiving mat 330, primary coil 335 may also be positioned in close proximity to the fuel tank 355. If the outer walls of fuel tank 355 are comprised of ferrous material, (e.g., steel), magnetic field 325 generated by primary coil 335 may be transmitted to the ferrous material, generating thermal energy, and thus inductively heat fuel tank 355 and any fuel contained there within. As described further herein, inductively heating a fuel tank in this manner may be utilized to perform active testing on one or more fuel system and/or evaporative emissions system components. In some examples, a magnetic shield 360 may be coupled to the underside of fuel tank 355 in order to prevent undesired heating of fuel tank 355. Magnetic shield 360 may be constructed from a non-ferrous, insulating material. Further, magnetic shield 360 may be operable to allow selective inductive heating of fuel tank 355. For example, all or a portion of magnetic shield 360 may be retractable from the underside of fuel tank 355. In some examples, magnetic shield 360 may comprise multiple shutters which may be selectively open and closed. In this way, inductive heating of fuel tank 355 may be enacted by retracting or opening magnetic shield 360, while extending or closing magnetic shield 360 may prevent inductive heating of fuel tank 355. In this way, a controller may selectively allow inductive heating of fuel tank 355.

Other ferrous components 365 may additionally or alternatively be deposed on the undercarriage of vehicle 305, and thus may also be energized via magnetic field 325. In some examples, ferrous components 365 may comprise a metal plate, or existing ferrous material on the vehicle, for instance the vehicle frame, exhaust passages, exhaust catalyst, oil pan, engine block, engine mounting brackets, fuel tank brackets, etc. As such, ferrous components 365 may be heated during an inductive charging event. A magnetic shield 370 may be coupled to ferrous components 365 in the same manner as magnetic shield 360 may be coupled to fuel tank 355. One or more ferrous components 365 may be selectively coupled to an energizing circuit 375. In this way, when ferrous components 365 are being energized via magnetic field 325, energizing circuit 375 may selectively direct energy to one or more additional energizable components. For example, energizing circuit 375 may be selectively coupled to an engine block, an oil pan, an engine coolant reservoir, an exhaust catalyst, and/or other vehicle components. As such, some vehicle components may be heated in anticipation of a vehicle and/or engine start-up event, thereby decreasing wear on the engine and other vehicle components and decreasing vehicle emissions.

Inductive heating of the fuel tank 355 during an inductive charging operation may actively generate fuel tank pressure that may be utilized for fuel system and Evap system evaporative emissions testing. By actively heating the fuel tank during an inductive charging operation, pressure may be provided for evaporative emissions testing under circumstances wherein sufficient heat was not rejected from the engine during a previous drive cycle, and/or during conditions where pressure or vacuum is not present in the fuel tank due to diurnal temperature cycle fluctuations. As described further herein and with regard to FIG. 5, fuel tank pressure may be generated to perform a fuel tank pressure sensor rationality test. Following a testing procedure, magnetic field 325 may be decoupled from fuel tank. In one example, decoupling magnetic field 325 from fuel tank 355 may comprise shielding magnetic field 325 from the fuel tank 355 via magnetic shield 360. In other examples, magnetic field 325 may be decoupled from fuel tank 355 by decoupling fuel tank 355 from energizing circuit 375, and/or by decoupling ferrous components 365 from magnetic field 325 by shielding magnetic field 325 via magnetic shield 370.

Inductive charging of battery 350 may be supplemented and/or substituted by direct charging. As an example, (A/C) power source 310 may be coupled to charging port 380 on vehicle 305 via a charging cable (not shown). Charging port 380 may provide current from power source 310 to AC/DC rectifier 345, wherein alternating current may be converted into direct current for charging battery 350.

As engine run-time in PHEVs is limited, opportunities to purge the contents of a fuel vapor canister to the engine intake for combustion are also limited. As such, the fuel tank may be sealed to prevent fuel vapor canister loading outside of refueling events, and may develop a pressure or vacuum as fuel vapor is generated or condensed, respectively. During a refueling event, the fuel tank may be unsealed, equilibrating the fuel tank pressure to atmospheric pressure. A fuel tank pressure transducer (FTPT), such as FTPT 291, may be employed to measure the magnitude of the fuel tank pressure/vacuum, and thus may provide feedback prior to a fuel tank depressurization event. For example, a duty cycle of a fuel tank isolation valve may be ramped according to the output of the FTPT. As such, the FTPT must periodically be tested for rationality to ensure the output of the FTPT is accurate and not stuck in range, for example. If the FTPT is stuck high in range, the controller may fail to recognize that the fuel tank has been depressurized and fail to allow access to the refueling port of the vehicle. Conversely, if the FTPT is stuck low in range, the controller may allow access to the vehicle refueling port prematurely, resulting in the expelling of pressurized fuel vapor through the refueling port.

FIG. 4 depicts a flow chart for a high level method 400 for a fuel tank pressure sensor rationality test. Instructions for carrying out method 400 and other methods included herein may be executed by a controller based on instructions stored in non-transitory memory of the controller, and in conjunction with signals received from sensors of the fuel system, such as the sensors described above with reference to FIGS. 1-3. The controller may employ actuators of the fuel system to adjust fuel system operation, according to the methods described below. While described with reference to the systems depicted in FIGS. 1-3, it should be understood that method 400 or similar methods may be applied to other systems without departing from the scope of this disclosure.

Method 400 begins at 405. At 405, method 400 includes evaluating operating conditions. Operating conditions may be measured, estimated, and/or inferred, and may be based on signals received from one or more sensors, as described with reference to FIG. 1. Among others, operating conditions may include various vehicle conditions, such as vehicle speed, vehicle location, vehicle operation status, etc., various engine conditions, such as engine operating mode, engine speed, engine load, etc., various fuel system conditions, such as fuel level, fuel tank pressure, canister load, etc., and various ambient conditions, such as ambient temperature, barometric pressure, humidity, etc.

Continuing at 410, method 400 includes determining whether a vehicle-off condition has been detected. A vehicle-off condition may include a key-off condition, a remote or near field vehicle-off request, a user setting a vehicle alarm, etc. If no vehicle-off condition is detected, method 400 then proceeds to 415, and includes maintaining the status of the fuel system. Method 400 may then end or return to 405.

If a vehicle-off condition is detected, method 400 then proceeds to 420. At 420, method 400 includes determining whether a passive fuel tank pressure transducer (FTPT) rationality test is indicated. An FTPT rationality test indication may be stored at a controller, and may be scheduled as a periodic maintenance test, or may be indicated responsive to predetermined operating conditions. An FTPT rationality test indication may be conditional based on operating conditions, such as fuel tank fill level. An FTPT rationality test indication may be superseded by other testing indications, such as fuel system and/or evaporative emissions leak test indications. If no FTPT rationality test is indicated, method 400 then proceeds to 415, and includes maintaining the status of the fuel system. Method 400 then ends.

If a passive FTPT rationality test is indicated, method 400 then proceeds to 425. At 425, method 400 includes determining and recording a current FTPT output and a current ambient temperature. In some examples, such as for vehicles that include a bifurcated or saddle fuel tank, the output of two or more FTPT sensors may be determined. Method 400 may further include determining an ambient barometric pressure, fuel temperature, fuel composition, and/or other parameters that may influence and/or be related to fuel tank pressure.

Continuing at 430, method 400 includes maintaining an FTIV closed for a vehicle-off soak. In this way, the fuel tank is isolated from atmosphere, and changes in ambient temperature may be assumed to correlate with changes in fuel tank pressure if the fuel tank and FTIV are intact. In some examples, one or more valves may be closed in addition to or as an alternative to the FTIV in order to isolate the fuel tank and FTPT from atmosphere. If a refueling event is requested, or another event triggers a fuel tank depressurization (e.g., fuel tank pressure increases above a predetermined threshold), method 400 may be suspended or aborted.

Continuing at 435, method 400 includes monitoring the output of the FTPT and the ambient temperature for the duration of the vehicle-off soak. The duration of the vehicle-off soak may be predetermined or may be based on current operating conditions, such as time of day. The vehicle-off soak duration may be may represent a period of time necessary for a change in ambient temperature to generate a change in fuel tank pressure which would result in a change in FTPT output greater than a threshold if the FTPT and fuel system are intact. In some examples, the vehicle controller may be placed in a sleep mode and awoken following a predetermined duration, or responsive to consecutive measured parameters. In some scenarios, the controller may be returned to a sleep mode if the ambient temperature has not changed by more than the indicated threshold. In some examples, the output of the FTPT and the ambient temperature may be recorded at the end of the vehicle-off soak, for example, at the next vehicle-on event. The vehicle-off soak may be interrupted by a vehicle-on condition, a refueling event, significant jostling of the vehicle (e.g., due to closing of a trunk or hood, towing of the vehicle, etc.), significant changes in ambient conditions, an inductive charging event, or other conditions that cause a change or fluctuation in fuel tank conditions.

Continuing at 440, method 400 includes determining whether the ambient temperature changed (increased or decreased) by more than a threshold between the initiation and termination of the vehicle-off soak. In examples wherein the ambient temperature is monitored constantly or periodically during the vehicle-off soak, detecting a change in ambient temperature (relative to the ambient temperature at the initiation of the vehicle-off soak) greater than a threshold may be considered the termination of the vehicle-off soak, even if the vehicle remains off. In other examples, the ambient temperature at the termination of the vehicle-off soak may be compared to the ambient temperature at the initiation of the vehicle-off soak.

If the ambient temperature change during the vehicle-off soak is below the threshold, method 400 then proceeds to 445. At 445, method 400 includes determining whether the maximum number of passive FTPT rationality tests has been exceeded. A number of attempted passive rationality tests may be stored at the vehicle controller. The number may be increased following a passive FTPT rationality test that meets predetermined criteria (e.g., longer than a minimum predetermined duration). The number may not be increased following a passive FTPT rationality test that does not meet the predetermined criteria. The number may be reset to zero following a decisive FTPT rationality test, which may include active and passive tests, as well as passing and failing test results. The maximum number of passive rationality tests may be predetermined, or may be based on operating conditions, such as operator driving patterns, time of year, etc. As an example, the maximum number of passive rationality tests may be set to 4, but in other examples, the maximum number may be greater or lower. By setting a maximum number of passive rationality tests, vehicles in regions with modest diurnal cycles (e.g., San Francisco, San Diego, Key West) may be relieved from perpetually performing passive rationality tests that are unlikely to result in a definitive result. In some examples, the maximum number of passive rationality tests may be adjusted over the life of the vehicle, for example, the maximum number may be reduced responsive to repeatedly reaching the maximum number without a definitive test result, and/or responsive to an average diurnal cycle over time that is below a threshold.

If the maximum number of passive FTPT rationality tests has not been reached, method 400 then proceeds to 450, and includes indicating to retry the passive rationality test at the next vehicle-off condition. For example, an indication may be stored at the vehicle controller. Method 400 may then end. If the maximum number of passive FTPT rationality tests has been reached, method 400 then proceeds to 455, and includes indicating to perform an active FTPT rationality test. An example method for an active FTPT rationality test is described herein and with regard to FIG. 5. Method 400 may then end.

Returning to 440, if the ambient temperature change during the vehicle-off soak is greater the threshold, method 400 then proceeds to 460. At 460, method 400 includes determining whether the output of the FTPT tracks with the ambient temperature over the vehicle-off soak duration. For example, a given change in ambient temperature may indicate a threshold change in FTPT output expected if the FTPT is intact. An increase in ambient temperature would correlate with an increase in fuel tank pressure, and thus an increase in FTPT output would be expected. Similarly, a decrease in ambient temperature would correlate with a decrease in fuel tank pressure, and thus a decrease in FTPT output would be expected. A threshold FTPT output may be indicated based on the ambient temperature change, the FTPT output at the initiation of the vehicle-off soak, and other conditions, such as fuel fill level, fuel tank temperature at the initiation of the vehicle-off soak, etc. The FTPT output at the termination of the vehicle-off soak may then be compared to the threshold. If the FTPT output is greater than the threshold, (given a positive ambient temperature change) the FTPT output may be considered to track with the ambient temperature. Similarly, an FTPT output less than the threshold may be considered to track with the ambient temperature for a negative ambient temperature change. In some examples, wherein the ambient temperature and FTPT output are sampled continuously or periodically throughout the vehicle-off soak, inflections in ambient temperature may be utilized to predict expected inflections in the FTPT output in determining whether the FTPT output tracks with the ambient temperature.

If it is determined that the FTPT output tracks with the ambient temperature over the vehicle-off soak, method 400 proceeds to 465. At 465, method 400 includes indicating that the FTPT is functional. This may include recording the passing test result at the vehicle controller, and may further include updating the current number of passive tests to zero. Continuing at 470, method 400 includes updating fuel system parameters. For example, FTPT rationality test schedules may be adjusted, and/or flags set due to a prior failing or indeterminate testing result may be removed. Further, fuel system parameters, such as undesired leak test parameters, may be updated to reflect an intact, rational FTPT. Method 400 may then end.

Returning to 460, if the FTPT output does not track with ambient temperature over the vehicle-off soak, method 400 proceeds to 475. At 475, method 400 includes determining whether the absolute value of the FTPT output is greater than a threshold. In other words, it is determined whether the FTPT output is within a threshold of atmospheric pressure, or outside of a threshold of atmospheric pressure. If the absolute value of the FTPT output is greater than a threshold, method 400 proceeds to 480, and includes indicating to perform an active FTPT rationality test, such as the active FTPT rationality test described herein and with regard to FIG. 5. If the absolute value of the FTPT output is not greater than the threshold, (e.g., within a threshold of atmospheric pressure), method 400 proceeds to 485, and includes indicating to perform an undesired emissions test. As described with regards to FIG. 2, an undesired emissions test may be performed during engine-on or vehicle-off conditions, and may include applying a vacuum or pressure to the fuel and/or evaporative emissions system, for example.

Following indicating additional testing, method 400 proceeds to 490, and includes updating fuel system parameters. For example, fuel system testing schedules may be updated. Further, fuel system and evaporative emissions system routines, methods, procedures, and tests may be updated to indicate that the output of the FTPT is unreliable. This may result in inferring fuel tank pressure based on other operating conditions, suspending procedures that rely on FTPT output, adjusting parameters for depressurizing the fuel tank in anticipation of a refueling event, etc. Method 400 may then end.

FIG. 5 depicts a flow chart for a high level method 500 for an active fuel tank pressure sensor rationality test. While described with reference to the systems depicted in FIGS. 1-3, it should be understood that method 500 or similar methods may be applied to other systems without departing from the scope of this disclosure.

Method 500 begins at 505 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing at 510, method 500 includes determining whether the vehicle is undergoing an inductive charging event. For example, as shown in FIG. 3, it may be determined whether the vehicle is parked above an inductive charging mat. This may be indicated by communication between the vehicle energy storage system and the vehicle controller. For example, the controller may be indicated that an inductive charging event is occurring based on amount of current traversing a secondary coil within a receiving mat, such as secondary coil 340 and receiving mat 330. If an inductive charging event is not occurring (and/or not imminent), method 500 proceeds to 515, and includes maintaining the current status of the vehicle fuel system. For example, a FTIV may be maintained closed, and fuel system operations may be maintained according to active operation routines and procedures.

If an inductive charging event is occurring (and/or is imminent), method 500 proceeds to 520. At 520, method 500 includes determining whether an active FTPT rationality test is indicated. An active FTPT rationality test indication may be stored at a controller. As described with regard to FIG. 5, an active FTPT rationality test may be indicated responsive to one or more indeterminate passive FTPT rationality tests, and/or responsive to an absolute FTPT output being greater than a threshold following a duration wherein the output of the FTPT does not track with ambient temperature while the fuel system is sealed from atmosphere. An active FTPT rationality test indication may be conditional based on operating conditions, such as fuel tank fill level. An active FTPT rationality test indication may be superseded by other testing indications, such as fuel system and/or evaporative emissions leak test indications. If no FTPT rationality test is indicated, method 500 then proceeds to 515, and includes maintaining the status of the fuel system. Method 500 then ends.

If an active FTPT rationality test is indicated, method 500 proceeds to 525. At 525, method 500 includes determining and recording a current FTPT output and a current fuel fill level. In some examples, such as for vehicles that include a bifurcated or saddle fuel tank, the output of two or more FTPT sensors and/or two or more fuel level sensors may be determined and recorded. Method 500 may further include determining an ambient temperature, barometric pressure, fuel temperature, fuel composition and/or other parameters that may influence and/or be related to fuel tank pressure.

Continuing at 530, method 500 includes maintaining an FTIV closed for the duration of the active FTPT rationality test. In this way, the fuel tank is isolated from atmosphere, and actively heating the fuel tank via inductive energy transfer may be assumed to correlate with changes in fuel tank pressure if the fuel tank and FTIV are intact. In some examples, one or more valves may be closed in addition to or as an alternative to the FTIV in order to isolate the fuel tank and FTPT from atmosphere. If a refueling event is requested, or another event triggers a fuel tank depressurization (e.g., fuel tank pressure increases above a predetermined threshold), method 500 may be suspended or aborted.

Continuing at 535, method 500 optionally includes inductively coupling the fuel tank to the inductive charging mat. As described with regards to FIG. 3, inductively coupling the fuel tank to the inductive charging mat may include adjusting the conformation of a magnetic shield to allow for ferrous components of the fuel tank to be exposed to the magnetic field generated by the inductive charging mat. In some examples, inductively coupling the fuel tank to the inductive charging mat may include inductively coupling the inductive charging mat to an energizing circuit, and electrically coupling ferrous components of the fuel tank to the energizing circuit. In examples wherein the fuel tank outer walls comprise a ferrous material, the fuel tank is situated within a threshold distance of the vehicle's inductive receiving mat, and the fuel tank is not protected by a magnetic shield, includes inductively coupling the fuel tank to the inductive charging mat may be unnecessary. In some examples, the position of the fuel tank relative to the inductive charging mat may preclude energizing of the fuel tank via inductive transfer of energy. In such a scenario, the method may be aborted, and a flag set at the vehicle controller to attempt an active FTPT rationality test at a subsequent charging event. The vehicle operator may be notified to adjust the positioning of the vehicle relative to the inductive charging mat prior to turning the vehicle off prior to the subsequent charging event.

When the fuel tank has been placed in a conformation to receive energy from the inductive charging mat, method 500 proceeds to 540, and includes indicating a duration for the active FTPT rationality test. The duration may represent an amount of time necessary to heat the fuel within the fuel tank by an amount which would correlate with a threshold increase in fuel tank pressure. The duration may be based on the amount of fuel stored within the fuel tank, the initial temperature of the stored fuel, the RVP of the stored fuel, the rate of inductive energy transfer from the inductive charging mat to the fuel tank, among other current fuel system conditions, inductive charging system conditions, and ambient conditions. For example, a fuel tank that is nearly full would require a longer testing duration than an equivalent fuel tank that is nearly empty, as the larger amount of fuel will take more energy to heat, and thus a longer duration. In some examples, the testing duration will be determined to be lapsed based on a change in fuel temperature rather than a specified amount of time.

Continuing at 545, method 500 includes recording the FTPT output following the testing duration. At 550, method 500 includes determining whether the change in FTPT output over the testing duration is greater than a threshold. As described above, the threshold may represent an expected change in FTPT output based on an increase in fuel pressure generated by an increase in fuel temperature due to inductive energy transfer from the inductive charging mat to the fuel tank over the testing duration. In other words, if the FTPT is functionally intact, the output should increase by at least the threshold amount. If the change in FTPT output is less than the threshold, method 500 proceeds to 555, and includes indicating FTPT degradation. Indicating FTPT degradation may include recording the failing test result at the controller, and may further include illuminating a malfunction indicator lamp (MIL) or otherwise communicating the failing test result to the vehicle operator. Continuing at 560, method 500 includes updating fuel system operating parameters based on the indicated FTPT degradation. For example, additional FTPT rationality tests may be scheduled, undesired emissions tests may be postponed or adjusted based on the FTPT offset, etc.

If the change in FTPT output is greater than the threshold, method 500 proceeds to 565, and includes indicating that the FTPT is rational. Indicating that the FTPT is rational may include recording the passing test at the controller, and may further include updating an FTPT testing schedule, and/or removing a flag set due to a prior failing or indeterminate testing result. Continuing at 560, method 500 may include updating and/or adjusting fuel system parameters based on a functional FTPT. For example, thresholds for future leak tests may be adjusted. FTPT rationality testing schedules may be updated.

When fuel system parameters have been updated, method 500 may optionally proceed to 570, and may include inductively decoupling the fuel tank from the inductive charging mat. As described with regards to FIG. 3, inductively decoupling the fuel tank from the inductive charging mat may include adjusting the conformation of a magnetic shield to block ferrous components of the fuel tank from the magnetic field generated by the inductive charging mat. In some examples, inductively decoupling the fuel tank from, the inductive charging mat may include inductively decoupling and energizing circuit from the inductive charging mat, and/or electrically decoupling ferrous components of the fuel tank from the energizing circuit. Method 500 may then end. In some examples, method 500 may further include managing the fuel tank pressure. For example, if the fuel tank cannot be inductively decoupled from the charging mat, the fuel stored within the fuel tank may be heated for the duration of the inductive charging event, thus generating fuel vapor and increasing fuel tank pressure. In some examples, responsive to fuel tank pressure increases above a threshold, fuel tank pressure management may include venting the fuel tank, for example by commanding open a FTIV. However, if undesired vapor emissions are indicated in the evaporative emissions system, opening an FTIV in order to vent pressure in the fuel tank may lead to undesired evaporative emissions and thus commanding open a FTIV may be reserved for pressure increases above a preselected level.

FIG. 6 depicts an example timeline 600 for determining the rationality of a fuel tank pressure transducer in a plug-in hybrid vehicle configured with an inductive charging system, such as the vehicle systems depicted in FIGS. 1-3. Timeline 600 includes plot 610, indicating a vehicle status over time; and plot 620, indicating the status of an inductive charging system over time. Timeline 600 further includes plot 630, indicating ambient temperature over time. Lines 632 and 634 represent ambient temperature thresholds for a passive FTPT rationality test. Timeline 600 further includes plot 640, indicating an FTIV status over time; plot 650, indicating a fuel tank fill level over time; and plot 660, indicating an FTPT output over time. Line 665 represents an FTPT output threshold for an active FTPT rationality test, while line 667 represents an active FTPT rationality test duration. Timeline 600 further includes plot 670, indicating a cumulative number of passive FTPT rationality tests over time. Line 675 represents a threshold number of passive FTPT rationality tests over time. Timeline 600 further includes plot 680, indicating whether FTPT degradation is indicated over time.

At time $t_0$, the vehicle is on, as indicated by plot 610. As such, the inductive charging system is inactive, as indicated by plot 620, and the FTIV is closed, as indicated by plot 640. At time $t_1$, the vehicle is turned off, but the inductive charging system is not engaged. A passive FTPT rationality test is thus indicated. Accordingly, the FTIV is maintained closed, and the passive FTPT rationality test counter is advanced, as indicated by plot 670. Based on the ambient temperature at time $t_1$, ambient temperature thresholds are established, as represented by lines 632 and 634. As described with regard to FIG. 4, an increase or decrease in ambient temperature greater than a threshold during the passive FTPT rationality test is required for the test to yield a definitive result. However, at time $t_2$, when the vehicle-off condition ends, the ambient temperature has not changed by more than the threshold amount. Accordingly, no FTPT degradation is indicated, as shown by plot 680. As the passive rationality test counter is now above the threshold represented by line 675, an active FTPT rationality is thus indicated.

From time $t_2$ to time $t_3$, the vehicle is on, and the fuel level decreases, as indicated by plot 650. At time $t_3$, a refueling event is initiated. As such, the FTIV is opened, as indicated by plot 640. The FTPT output decreases, as the fuel tank is vented. The addition of fuel then causes the fuel level to increase, and the FTPT output to increase. At time $t_4$, the refueling event ends, the FTIV is closed, and the vehicle is turned on.

The vehicle remains on from time $t_4$ to time $t_5$, accompanied by a decrease in fuel level. At time $t_5$, the vehicle is turned off, and an inductive charging event is initiated. As the passive FTPT rationality test counter is above the threshold represented by line 675, an active FTPT rationality test is initiated. The FTIV is maintained closed, an FTPT output threshold is established, as represented by line 665, and a testing duration is established, as represented by line 667. As the fuel within the fuel tank is heated via inductive energy transfer, fuel vapor is generated, and the FTPT output increases. At time $t_6$, prior to the end of the testing duration, the FTPT output reaches the threshold represented by line 665. Accordingly, no FTPT degradation is indicated, and the passive FTPT rationality test counter is reset to 0. A time $t_7$, the inductive charging event ends, and the FTPT output begins to decrease.

The systems described herein and with reference to FIGS. 1-3, along with the methods described herein and with reference to FIGS. 4-5 may enable one or more systems and one or more methods. In one example, a method for a hybrid-electric vehicle is presented, comprising: during a first condition, including an inductive charging event, sealing a fuel tank closed; and indicating degradation of a fuel tank pressure transducer responsive to a fuel tank pressure transducer output failing to increase above a threshold following an active testing duration. In such an example, or any other example, the method may additionally or alternatively comprise updating one or more fuel system parameters responsive to an indication of fuel tank pressure transducer degradation. In any of the preceding examples, or any other example, the one or more fuel system parameters may additionally or alternatively include a fuel system undesired emissions test schedule. In any of the preceding examples, or any other example, the first condition may additionally or alternatively include a threshold number of previous indeterminate passive fuel tank pressure transducer rationality tests. In any of the preceding examples, or any other example, the first condition may additionally or alternatively include a previous passive fuel tank pressure transducer rationality test wherein a fuel tank pressure transducer output failed to track with a change in ambient temperature during a vehicle-off soak comprising a sealed fuel tank. In any of the preceding examples, or any other example, the first condition may additionally or alternatively include a fuel tank pressure transducer output that is greater than a threshold following the vehicle-off soak of the previous passive fuel tank pressure transducer rationality test. In any of the preceding examples, or any other example, the active testing duration may additionally or alternatively be based on at least a fuel tank fill level. In any of the preceding examples, or any other example, the fuel tank pressure transducer output threshold may additionally or alternatively be based on at least a temperature of fuel stored in the fuel tank. In any of the preceding examples, or any other example, the method may additionally or alternatively comprise inductively coupling the fuel tank to an inductive charging mat located beneath an underbody of the hybrid-electric vehicle. In any of the preceding examples, or any other example, inductively coupling the fuel tank to the inductive charging mat may additionally or alternatively include adjusting the position of a magnetic shield coupled to the fuel tank. In any of the preceding examples, or any other example, inductively coupling the fuel tank to the inductive charging mat may additionally or alternatively include coupling ferrous components of the fuel tank to an energizing circuit that is inductively coupled to the inductive charging mat. In any of the preceding examples, or any other example, the method may additionally or alternatively comprise decoupling the fuel tank from the inductive charging mat following the active testing duration.

In another example, a system for a vehicle is presented, comprising: a primary inductive coil external to the vehicle configured to receive electrical power from an external power source for generating a magnetic field; a secondary inductive coil onboard the vehicle configured such that the magnetic field generated from the primary inductive coil induces a current in the secondary inductive coil in a non-contact manner; a rechargeable energy storage device configured such that the magnetic field generated from the primary inductive coil inductively charges the energy storage device via the induced current in the secondary inductive coil; a fuel tank including one or more ferrous components at an outer surface of the fuel tank, such that the magnetic field generated from the primary inductive coil energizes the one or more ferrous components; a fuel tank isolation valve configured to seal the fuel tank from atmosphere when closed; a fuel tank pressure transducer positioned between the fuel tank and the fuel tank isolation valve; a controller configured with instructions stored in non-transitory memory, that when executed cause the controller to: during a first condition, including an indication that the energy storage device is being charged via an inductive charging operation, monitoring an output of the fuel tank pressure transducer; and indicating degradation of the fuel tank pressure transducer following an active testing duration wherein the output of the fuel tank pressure transducer failed to increase above a threshold. In such an example system, or any other example system, the active testing duration may additionally or alternatively be based at least on a level of fuel stored in the fuel tank. In any of the preceding example systems, or any other example system, the first condition may additionally or alternatively include an indication of one or more previous indeterminate passive fuel tank rationality tests. In any of the preceding example systems, or any other example system, the system may additionally or alternatively comprise a magnetic shield configured to selectively expose the one or more ferrous components at the outer surface of the fuel tank to the magnetic field generated from the primary inductive coil.

In yet another example, a method for a hybrid-electric vehicle is presented, comprising: during a vehicle-off condition, sealing a fuel tank from atmosphere; indicating an initial fuel tank pressure transducer output and an initial ambient temperature at an initiation of the vehicle-off condition; indicating a final fuel tank pressure transducer output and a final ambient temperature at a termination of the vehicle-off condition; responsive to a final ambient temperature that is different from the initial ambient temperature by more than a threshold, indicating whether the final fuel tank pressure transducer output is within a threshold of an expected fuel tank pressure transducer output; responsive to the final fuel tank pressure transducer output not being within a threshold of the expected fuel tank pressure transducer output, indicating to perform an active fuel tank pressure transducer rationality test responsive to the final fuel tank pressure transducer output being more than a threshold from atmospheric pressure; and responsive to the final fuel tank pressure transducer output not being within a threshold of the expected fuel tank pressure transducer output, indicating to perform an undesired evaporative emissions test responsive to the final fuel tank pressure transducer output being less than a threshold from atmospheric pressure. In such an example, or any other example, the method may additionally or alternatively comprise: responsive to an indication to perform an active fuel tank pressure transducer rationality test, inductively energizing ferrous components of the fuel tank for an active testing duration while maintaining the fuel tank sealed from atmosphere; and indicating degradation of the fuel tank pressure transducer responsive to a fuel tank pressure transducer output failing to increase above a threshold following the active testing duration. In any of the preceding example methods, or any other example method, inductively energizing ferrous components of the fuel tank may additionally or alternatively comprise positioning the fuel tank above an inductive charging mat configured to generate a magnetic field. In any of the preceding example methods, or any other example method, inductively energizing ferrous components of the fuel tank may additionally or alternatively comprise actively exposing one or more ferrous components of the fuel tank to a magnetic field generated by the inductive charging mat.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid-electric vehicle, comprising:
   during a first condition, including an inductive charging event, sealing a fuel tank closed by commanding closure of a fuel tank isolation valve; and
   indicating degradation of a fuel tank pressure transducer responsive to a fuel tank pressure transducer output failing to increase above a threshold following an active testing duration implemented during the inductive charging event.

2. The method of claim 1, further comprising:
   updating one or more fuel system parameters responsive to an indication of fuel tank pressure transducer degradation.

3. The method of claim 2, wherein the one or more fuel system parameters include a fuel system undesired emissions test schedule.

4. The method of claim 1, wherein the first condition includes a threshold number of previous indeterminate passive fuel tank pressure transducer rationality tests.

5. The method of claim 1, wherein the first condition includes a previous passive fuel tank pressure transducer rationality test wherein a fuel tank pressure transducer output failed to track with a change in ambient temperature during a vehicle-off soak.

6. The method of claim 5, wherein the first condition further includes a fuel tank pressure transducer output that is greater than the threshold following the vehicle-off soak of the previous passive fuel tank pressure transducer rationality test.

7. The method of claim 1, wherein the active testing duration is based on at least a fuel tank fill level.

8. The method of claim 1, wherein the fuel tank pressure transducer output threshold is based on at least a temperature of fuel stored in the fuel tank.

9. The method of claim 1, further comprising:
   inductively coupling the fuel tank to an inductive charging mat located beneath an underbody of the hybrid-electric vehicle.

10. The method of claim 9, wherein inductively coupling the fuel tank to the inductive charging mat includes adjusting a position of a magnetic shield coupled to the fuel tank.

11. The method of claim 9, wherein inductively coupling the fuel tank to the inductive charging mat includes coupling ferrous components of the fuel tank to an energizing circuit that is inductively coupled to the inductive charging mat.

12. The method of claim 9, further comprising:
decoupling the fuel tank from the inductive charging mat following the active testing duration.

13. A system for a vehicle comprising:
a primary inductive coil external to the vehicle configured to receive electrical power from an external power source for generating a magnetic field;
a secondary inductive coil onboard the vehicle configured such that the magnetic field generated from the primary inductive coil induces a current in the secondary inductive coil in a non-contact manner;
a rechargeable energy storage device configured such that the magnetic field generated from the primary inductive coil inductively charges the rechargeable energy storage device via the induced current in the secondary inductive coil;
a fuel tank including one or more ferrous components at an outer surface of the fuel tank, such that the magnetic field generated from the primary inductive coil energizes the one or more ferrous components;
a fuel tank isolation valve configured to seal the fuel tank from an atmosphere when closed;
a fuel tank pressure transducer positioned between the fuel tank and the fuel tank isolation valve; and
a controller configured with instructions stored in non-transitory memory, that when executed cause the controller to:
close the fuel tank isolation valve during an inductive charging event;
during a first condition, including an indication that the rechargeable energy storage device is being charged via the inductive charging event, monitor an output of the fuel tank pressure transducer; and
indicate degradation of the fuel tank pressure transducer following an active testing duration wherein the output of the fuel tank pressure transducer failed to increase above a threshold during the inductive charging event.

14. The system of claim 13, wherein the active testing duration is based at least on a level of fuel stored in the fuel tank.

15. The system of claim 13, wherein the first condition includes an indication of one or more previous indeterminate passive fuel tank rationality tests.

16. The system of claim 13, further comprising:
a magnetic shield configured to selectively expose the one or more ferrous components at the outer surface of the fuel tank to the magnetic field generated from the primary inductive coil.

17. A method for a hybrid-electric vehicle, comprising:
during a vehicle-off condition and during an inductive charging event, sealing a fuel tank from an atmosphere by closing a fuel tank isolation valve;
indicating an initial fuel tank pressure transducer output and an initial ambient temperature at an initiation of the vehicle-off condition during the inductive charging event;
indicating a final fuel tank pressure transducer output and a final ambient temperature at a termination of the vehicle-off condition;
responsive to the final ambient temperature being that is different from the initial ambient temperature by more than a threshold, indicating whether the final fuel tank pressure transducer output is within a threshold of an expected fuel tank pressure transducer output;
responsive to the final fuel tank pressure transducer output not being within the threshold of the expected fuel tank pressure transducer output, performing an active fuel tank pressure transducer rationality test responsive to the final fuel tank pressure transducer output being more than a threshold from atmospheric pressure; and
responsive to the final fuel tank pressure transducer output not being within the threshold of the expected fuel tank pressure transducer output, performing an undesired evaporative emissions test responsive to the final fuel tank pressure transducer output being less than the threshold from atmospheric pressure.

18. The method of claim 17, further comprising:
responsive to an indication to perform the active fuel tank pressure transducer rationality test, inductively energizing ferrous components of the fuel tank for an active testing duration while maintaining the fuel tank sealed from an atmosphere; and
indicating degradation of a fuel tank pressure transducer responsive to a fuel tank pressure transducer output failing to increase above a threshold following the active testing duration.

19. The method of claim 18, wherein inductively energizing ferrous components of the fuel tank comprises positioning the fuel tank above an inductive charging mat configured to generate a magnetic field.

20. The method of claim 19, wherein inductively energizing ferrous components of the fuel tank comprises actively exposing the ferrous components of the fuel tank to the magnetic field generated by the inductive charging mat.

* * * * *